United States Patent
Reichardt et al.

(10) Patent No.: US 7,462,333 B2
(45) Date of Patent: Dec. 9, 2008

(54) DEVICE FOR THE PURIFICATION OF EXHAUST GASES CONSISTING OF FLUORINE-CONTAINING COMPOUNDS IN A COMBUSTION REACTOR

(75) Inventors: Horst Reichardt, Dresden (DE); Andreas Frenzel, Dresden (DE); Konrad Gehmlich, Meissen (DE); Wido Wiesenberg, Dresden (DE); Egbert Merforth, Dresden (DE); Lothar Ritter, Langebrück (DE)

(73) Assignee: Das-Dunnschicht Anlagen Systeme GmbH Dresden, Dresden (DE)

( * ) Notice: Subject to any disclaimer, the term of this patent is extended or adjusted under 35 U.S.C. 154(b) by 816 days.

(21) Appl. No.: 10/510,821

(22) PCT Filed: Apr. 4, 2003

(86) PCT No.: PCT/EP03/03517

§ 371 (c)(1),
(2), (4) Date: Oct. 12, 2004

(87) PCT Pub. No.: WO03/085321

PCT Pub. Date: Oct. 16, 2003

(65) Prior Publication Data

US 2005/0172616 A1  Aug. 11, 2005

(30) Foreign Application Priority Data

Apr. 11, 2002 (DE) .................. 102 15 864
Feb. 5, 2003 (DE) .................. 103 04 489

(51) Int. Cl.
*B01D 50/00* (2006.01)

(52) U.S. Cl. ............................. 422/182; 422/173
(58) Field of Classification Search ............... 422/168, 422/173, 182; 431/5, 8, 12
See application file for complete search history.

(56) References Cited

U.S. PATENT DOCUMENTS

| | | | |
|---|---|---|---|
| 5,183,646 | A | 2/1993 | Anderson et al. |
| 2002/0041836 | A1 | 4/2002 | Komai et al. |

FOREIGN PATENT DOCUMENTS

| | | | |
|---|---|---|---|
| DE | 43 20 447 | A1 | 12/1994 |
| DE | 196 31 873 | C1 | 10/1997 |
| EP | 0 347 753 | B1 | 10/1993 |
| EP | 735321 | A2 * | 10/1996 |
| EP | 735322 | A2 * | 10/1996 |
| EP | 0 819 887 | A3 | 1/1998 |
| EP | 1 033 533 | A1 | 9/2000 |
| EP | 1 143 197 | A1 | 10/2001 |
| GB | 2308991 | A * | 7/1997 |

* cited by examiner

*Primary Examiner*—Tom P. Duong
(74) *Attorney, Agent, or Firm*—Browdy and Neimark, P.L.L.C.

(57) ABSTRACT

In a device for the purification of exhaust gases, especially exhaust gases consisting of fluorine-containing compounds, bore holes (7,8) are made in a ring burner (5) for the separate supply of combustion gas and oxygen on a single hole circle around a central exhaust gas supply (9). The ring burner is arranged in a combustion chamber (1). The combustion chamber is closed up to an annular gap (20) between a cylindrical jacket (4) and a front face (16). Additional oxygen or additional air is introduced into the annular gap (20).

10 Claims, 3 Drawing Sheets

DEVICE FOR THE PURIFICATION OF EXHAUST GASES CONSISTING OF FLUORINE-CONTAINING COMPOUNDS IN A COMBUSTION REACTOR

The present invention relates to a device for the purification of pollutant-laden exhaust gases in a combustion chamber by thermal-chemical conversion.

In technical plants, especially in vapour phase deposition units and facilities for the removal of material by means of plasma processes used in semiconductor plants, pollutant-laden exhaust gases are produced. An important group of these exhaust gases contain fluorine-containing hydrocarbons or other fluorine compounds. In addition to these pollutants, the exhaust gas mainly contains nitrogen as carrier gas. Said pollutants and their reaction products are toxic and environmentally harmful, and the exhaust gas must therefore be purified in a suitable device in order to remove them. In such devices for the purification of exhaust gases, the pollutants contained in the exhaust gas are thermally-chemically converted in a combustion chamber in which they are subjected to a flame produced by the combustion of a fuel gas in pure oxygen or in air (U.S. Pat. No. 5,183,646). Harmful secondary products of this conversion process (e.g. HF) are subsequently removed from the exhaust gas treated in the combustion chamber by means of sorption or scrubbing processes.

Devices for the purification of exhaust gases normally use a multistage process. Sub-processes take place, such as thermal-chemical decomposition, oxidation, cooling, sorption, hydrolysis and the removal of liquid and solid reaction products by means of scrubbing. To this end, the exhaust gas is first introduced in a combustion chamber and subsequently passes through at least one more process device which e.g. works according to the scrubbing principle (EP 89 110 875, DE 43 20 447).

A device for the purification of exhaust gases must fulfil a number of requirements: The purification process must be highly efficient, i.e. the amount of primary pollutants contained in the purified exhaust gas must be as small as possible. In addition, an effective removal of secondary pollutants must be achieved in the scrubbing unit. The exhaust gas purification process must further be economical; in particular, the consumption of fuel gas must be low compared to the volume of the exhaust gas stream to be cleaned. Finally it must be ensured that no toxic carbon monoxide and, above all, no nitrogen oxide is produced during the purification process.

The design of the combustion chamber and, above all, of the burner decisively influences the efficiency and economy as well as the non-production of secondary pollutant gases.

The combustion chamber is generally designed as a cylindrical body and the burner, typically a ring burner, is inserted in one of the end faces thereof. The exhaust gas and a fuel gas mixture are supplied to said ring burner, the first one usually via a central inlet and the second most simply via an annular gap. Once the fuel gas has been ignited by means of an ignition device, a flame forms above the annular gap, into which flame the exhaust gas is introduced.

In the fuel gas flame, several reactions take place under the effect of oxygen ($O_2$) supplied simultaneously, the most important of which is the combustion of the fuel gas, e.g. propane ($C_3H_8$), methane ($CH_4$), hydrogen ($H_2$) or mixtures of the aforesaid gases, in order to thermally activate the pollutant gases and chemically convert the pollutant gases (e.g. $CF_4$, $C_2F_6$, $CHF_3$) into hydrolyzable and adsorbable harmful compounds (e.g. HF) and harmless compounds (e.g. $CO_2$). Due to the reaction kinetics, it cannot be expected that the desired conversion of the pollutant gases will be complete. This is not even the case when the fuel gas and oxygen are supplied at a stoichiometric ratio (e.g. $CH_4$ and $O_2$ at a ratio of 1:2 or $C_3H_8$ and $O_2$ at a ratio of 1:5). The so-called $\lambda$-value of the aforesaid gas mixtures is 1 (the air ratio $\lambda$ is the ratio of the amount of oxygen supplied to the combustion process to the amount required for complete combustion). The high content of inert gas ($N_2$) in the exhaust gas adversely affects the reaction kinetics, resulting in a reduced conversion of the pollutant gas.

As a result, the efficiency of the purification process is poor, i.e. the amount of pollutants remaining in the purified exhaust gas is too high.

If the ratio of fuel gas to oxygen is changed so that the amount of fuel gas is higher than at the stoichiometric ratio ($\lambda$-value<1), the degree of pollutant conversion is improved and the formation of nitrogen oxide reduced, but at the same time harmful carbon monoxide and unburned fuel gas will be discharged from the gas purification device. On the other hand, an increase of the amount of oxygen contained in the fuel gas/oxygen mixture compared to the stoichiometric ratio ($\lambda$-value of the supplied mixture>1) will critically worsen pollutant conversion, particularly in the case of fluorine-containing exhaust gases, resulting in unacceptably high remaining pollutant contents in the purified exhaust gas. In addition, harmful nitrogen oxides will be produced in an oxygen-rich, hot flame.

In the purification of pollutant-laden exhaust gases, particularly those containing fluorine-containing compounds, by thermal-chemical conversion in a fuel gas flame, progress has been made by using a burner provided with a central exhaust gas inlet, in which burner the fuel gas/oxygen mixture is supplied via two concentric annular gaps or via drill holes arranged on two concentric hole circles (EP 0 735 321 A2). If two fuel gas/oxygen mixtures of different composition are supplied in a spatially separate manner, two flame portions having a different thermal-chemical effect are realized. A flame portion having a reducing effect is obtained above the inner annular gap or the inner drill holes by means of an excess of fuel gas ($\lambda$<1) compared to the stoichiometric ratio to oxygen, while a flame portion having an oxidizing effect is obtained above the outer annular gap or the outer drill holes by means of an oxygen excess ($\lambda$>1) (EP 0735 321 A2). Due to the higher concentration of reducing reactants, such as H atoms and $CH_x$ radicals, an increased amount of pollutant molecules are decomposed in the flame portion with $O_2$ deficit. Here, the supplied fuel gas is not consumed completely. The complete combustion of the fuel gas and the CO conversion of CO produced in the reducing flame portion into $CO_2$ take place in a second flame portion with $O_2$ excess surrounding the first flame portion.

However, even if a burner producing a reducing inner flame portion and an oxidizing outer flame portion due to the spatially separate supply of different gas mixtures is used for gas purification, there are restrictions with regard to technical application. For example, the temperatures required for the thermal reaction under reducing conditions are only achieved at a certain distance from the burner and, in particular, only in a restricted volume. On the other hand, oxygen must be supplied into the oxidizing flame portion to such an extent that the complete oxidation of the fuel gas and of secondary pollutants, e.g. CO, is ensured. As a result, the flame envelope considerably contributes to the limitation of the volume of the reducing flame portion. Therefore, gas purification devices having a burner as described above and in which a reducing and an oxidizing fuel gas/oxygen mixture are supplied separately are suitable for relatively small exhaust gas volumes only.

In order to be able to purify large exhaust gas volumes effectively, burners have therefore been proposed in which two reducing flame portions are realized by means of two concentric rings or drill holes arranged on two concentric hole circles. Both flame portions are operated with fuel gas/oxygen mixtures whose λ-values are <1 in order to increase the volume in which there are favourable conditions for pollutant conversion (EP 011 208 41). In this solution, the complete oxidation of unburned fuel gas and of carbon monoxide produced in the reducing flame portions is achieved by the additional, separate supply of oxygen or air. Said additional oxygen or additional air is introduced via nozzles or slots arranged around or near the burner. In this way, a fuel gas/oxygen mixture characterized by a λ-value>1 acts in the envelope of the reducing flame portions. As a result, the flame envelope constitutes an additional oxidizing flame portion (EP 011 208 41).

The aforesaid solution still has the drawback that the reducing flame portion, which is advantageous for pollutant conversion, remains limited due to the fact that the flame's circumference is exposed to oxygen acting thereon. Moreover, the additional oxygen inlet near the burner leads to such high temperatures in a part of the flame that harmful nitrogen oxides will be produced there.

Burners using fuel gas/oxygen mixtures are also problematic in that the burner's design must be precisely adapted to match the specific operating conditions (type of pollutant gas, amount of exhaust gas and resulting amount of mixture). If the proportion of fuel gas to oxygen is changed, the discharge velocity from the burner and consequently the flame velocity will change. However, a discharge velocity of the fuel gas mixture higher than the flame velocity entails the risk that the flame will be extinguished. If, on the other hand, the discharge velocity of the mixture is lower than the flame velocity, backfires may result. Both risks must be eliminated by appropriately adapting the burner. However, a gas purification device must be able to operate safely without any need to adapt the burner to differing types of pollutant gas or amounts of exhaust gas; the need to adapt the burner is a disadvantage.

If the fuel gas and oxygen are supplied separately to the burner, the aforesaid operating conditions, i.e. the type of pollutant gas and amount of exhaust gas, can vary widely during operation without any need to change the burner's design. Adaptations are made by appropriately controlling the amounts of fuel gas and oxygen supplied. Exhaust gas treatment in reducing and oxidizing flame portions is possible even if the fuel gas and oxygen are supplied separately to the burner. A suitable burner is provided with two concentric slots or drill holes arranged on two concentric hole circles. Fuel gas and oxygen are introduced separately, at a ratio corresponding to a λ-value of <1 once they have mixed above the burner, and a reducing flame will form above the burner. If additional oxygen or air from the surroundings of the burner is supplied into the flame envelope, an oxidizing flame portion is obtained in which remaining fuel gas will be converted and CO produced in the reducing flame portion will be oxidized to $CO_2$.

The aforesaid design and operation mode of the burner still have the drawbacks that the reducing flame portion remains limited, resulting in a limited efficiency of the pollutant gas conversion process and the production of nitrogen oxide in hot, oxidizing flame portions. Another disadvantage is the formation of soot in those parts where the local λ-value of the immediately surrounding gas mixture is very low, i.e. near 1.

The object of the present invention is to eliminate drawbacks of state-of-the-art devices used for the purification of exhaust gases by thermal-chemical conversion. It must be ensured that large exhaust gas volumes are cleaned of pollutants with high efficiency and good economy as regards fuel gas consumption. No soot must deposit on the burner. The purified exhaust gas must have very low contents of unburned fuel gas, carbon monoxide and, in particular, nitrogen oxide.

The inventive solution is based on the assumption that the purification of pollutant-laden exhaust gases, particularly those containing fluorocarbon compounds and other fluorine-containing compounds and nitrogen as carrier gas, by thermal-chemical conversion takes place in a cylindrical combustion chamber which is provided with a burner and integrated with a subsequent scrubbing unit. The burner has a central exhaust gas inlet. The fuel gas and oxygen are supplied separately to the burner, up to its discharge nozzles for forming a flame. The hot, treated exhaust gas exiting from the combustion chamber is aftertreated with a scrubbing agent in a scrubbing unit. During aftertreatment, the hot exhaust gas is cooled and harmful secondary products are removed from the exhaust gas.

According to the invention, the burner is a ring burner provided with drill holes for the separate supply of fuel gas and oxygen, which holes are arranged on a single hole circle around the central exhaust gas inlet. Said separate supply is achieved by introducing fuel gas and oxygen in a locally alternate manner via adjacent drill holes. To this end, two annular channels are arranged in the ring burner, which are alternately connected to the drill holes on the hole circle. A connecting pipe leads out of the burner from each annular channel. Fuel gas is supplied to the burner through one of the connecting pipes, oxygen is supplied through the other.

The alternate supply of fuel gas and oxygen via the drill holes ensures that both gases will mix thoroughly at the very moment they exit from the burner. The flame forms very close to the surface of the burner. In this way, only hot flame portions come into contact with the exiting pollutant gas. Pollutant gas is prevented from just mixing with parts of the fuel gas. This obviously minimizes soot deposits on the burner, particularly near the exhaust gas inlet.

The aforesaid burner is particularly suitable for burning fuel gas supplied separately from oxygen with an oxygen deficit corresponding to λ-values down to 0.6 in the fuel gas/oxygen mixture which is present directly above the burner. The ring burner ensures the formation of a stable, homogenous flame with effective energy output for the most different fuel gas and oxygen streams, thus enabling adaptation to differing pollutant gases and exhaust gas streams. Said adaptation does not require the exchange of the burner for another one having adapted drill holes. In addition to fluorocarbons and other fluorine compounds, the burner is suitable for removing reactive pollutants such as $SiH_4$, $WF_6$ and TEOS.

According to the invention, said burner is used in a combustion chamber which is closed except for an annular gap between the cylindrical jacket of the combustion chamber and the end face of the combustion chamber located opposite the burner. In this way, no air, and consequently no oxygen, flows to the vicinity of the burner, e.g. via slots in the wall of the combustion chamber. The combustion chamber is at least tight enough that air flowing in from the outside accounts for less than approx. 3% of the oxygen supplied into the burner.

If fuel gas and oxygen are supplied separately to the burner and the burner is operated with a fuel gas excess corresponding to a mixture whose λ-value is e.g. 0.8, a reducing flame portion will not just form above the burner, but the whole flame will have a reducing effect during the thermal-chemical conversion of the pollutants. Since no air flows in from outside the burner, i.e. the flame is not exposed to oxygen, reducing conditions are obtained even in the flame envelope. Finally, there will be reducing conditions virtually throughout the whole volume of the combustion chamber. Compared to the volume of a flame having reducing and oxidizing flame portions, a larger volume with a high concentration of H atoms and $CH_3$ radicals, i.e. the reactants required for reducing the pollutants (e.g. $C_2F_6$, $CF_4$, $CHF_3$) to other gaseous reaction products such as HF, is achieved. The energy needed for the thermal activation of the reactants is produced by burning parts of the fuel gas, i.e. the oxidation process going on in parallel. Owing to the aforesaid conditions, the device according to the invention can be operated at a lower temperature ($T<\approx1,200°$) than a device having reducing and oxidizing flame portions. The higher concentration of the reducing reactants compensates, or even more than compensates, for the positive influence a higher temperature would have on the reactions. In this way, the pollutants are converted in a highly efficient manner at a relatively low temperature. The conditions for the formation of nitrogen oxides from the neutral gas portion of the exhaust gas are strongly limited since the thermal-chemical conversion of the pollutants takes place at a relatively low temperature and with an oxygen deficit in the reaction chamber. As a result, the amount of nitrogen oxide contained in the treated exhaust gas stream exiting from the combustion chamber is strongly reduced.

In the aforedescribed mode of operation, the hot exhaust gas stream exiting from the cylindrical jacket of the combustion chamber does not only contain the reaction products of the combustion process and the thermal-chemical conversion, i.e. mainly $CO_2$, HF, CO and $H_2O$, but also unburned fuel gas constituents ($CH_4$ and CO) due to the oxygen deficit in the combustion chamber. The hot exhaust gas is not completely oxidized at the end of the combustion chamber.

For complete combustion, the exhaust gas stream is subjected to another oxidation process. To this end, in a first embodiment of the invention two or more pipes are arranged in said annular gap between the cylindrical jacket of the combustion chamber and the end face of the combustion chamber located opposite the burner, which pipes are distributed on the gap's circumference, face towards the axis of the combustion chamber and serve to supply additional oxygen or air. In another embodiment, additional oxygen or air is supplied into said annular gap evenly along its circumference via an annular channel arranged at the end face of the cylindrical jacket of the combustion chamber. Moreover, a body, preferably a plate, made of a heat-resistant material is arranged in front of the metallic end face of the combustion chamber in a heat-insulated manner, e.g. by means of retaining webs. The hot exhaust gas stream hits this plate. In order to be passed on to the subsequent scrubbing unit via the annular gap, it is deflected by 90° and distributed radially. Said deflection and radial distribution result in turbulence in the hot exhaust gas stream. The aforesaid plate prevents the hot exhaust gas stream from contacting the end face of the combustion chamber. The end face is relatively cold since it also delimits the scrubbing unit and is therefore cooled by the scrubbing liquid (T ranging between 20° and 90° Celsius). In contrast, the plate arranged in a heat-insulated manner almost heats up to the temperature of the hot exhaust gas stream, i.e. $T>800°$ Celsius, on its side facing towards the combustion chamber. While the hot exhaust gas stream flows out of the gap, oxygen (or air) enters via the pipes arranged in the gap, enhancing the turbulence in the hot exhaust gas stream in the area of contact with the latter. The amount of oxygen (or air) let in is such that a $\lambda$-value of $>1$, preferably $\lambda=1.2$, is achieved in the mixture of supplied oxygen (or supplied air) and hot exhaust gas. This means, oxygen (or air) is supplied to a degree that the oxygen deficit in the combustion chamber is at least neutralized. With the aforesaid $\lambda$-value of the mixture of hot exhaust gas and supplied oxygen (or supplied air), oxidizing conditions are achieved at the prevailing temperature ($800°<T<1,200°$). The reactions which preferably take place here have the character of a secondary combustion. CO which has been produced in the combustion chamber in the primary combustion process and remaining, unburned fuel gas are converted into $CO_2$ and $H_2O$. The temperature in the area between the end of the cylindrical jacket and said hot plate is lower than required for the conversion of the fluorine-containing pollutants, but high enough for the combustion of CO and remaining fuel gas.

The strong turbulence produced and the resulting thorough mixing, the temperature level of the exhaust gas stream in this area and the adapted, high $\lambda$-value ensure a complete, effective afterburning in a rather limited space in the transition area to the scrubbing unit.

Once complete combustion has finished, the exhaust gas enters the scrubbing unit. Here, the hot exhaust gas stream is cooled, HF is neutralized and solid particles formed during the combustion process are washed out. The purified, cooled exhaust gas is then passed on into the exhaust air channel of the production plant.

The use of the device according to the invention is advantageous in that it ensures a reduction of the specific amount of fuel gas required, thus improving the economy of the exhaust gas purification process. The reduction of the amount of fuel gas required is achieved by the reduced total flow due to the fact that air or $O_2$ are prevented from reaching the vicinity of the burner. The special solutions described above ensure a highly efficient pollutant conversion process. At the same time, the solution in respect of the burner ensures the formation of a stable flame for widely differing fuel gas/oxygen ratios, differing pollutant gases in the exhaust gas and differing amounts of pollutant gas without any need to adapt the design of the burner.

A particularly significant advantage is the strong reduction of the amount of nitrogen oxides discharged with the purified exhaust gas. Said discharge is approximately five times lower than in a state-of-the-art device using a ring burner, supply of a fuel gas/oxygen mixture and supply of additional oxygen in the area of the ring burner, provided both devices are operated under similar conditions.

Another advantage of the device according to the invention is that it can also be used for the purification of exhaust gases containing pollutants whose thermal-chemical conversion requires a relatively low energy input, e.g. $SiH_4$, without changing its design.

As regards the design of the ring burner, the individual holes are conveniently drilled with uniform diameter on a single hole circle around the central exhaust gas inlet and distributed evenly on the circumference of said circle. During the alternate supply of fuel gas and oxygen into said drill holes, a thorough mixing of fuel gas and oxygen is ensured by the fact that the gas exiting from a hole is in direct contact with the gases exiting from the two adjacent holes.

However, it can also be useful that the drill holes which are distributed evenly on the hole circle around the central exhaust gas inlet have two different diameters. If e.g. the burner is operated with methane and oxygen and reducing conditions are to be achieved in the combustion chamber, corresponding to a $\lambda$-value of 0.8 of the gases entering the chamber and mixing directly above the burner surface (fuel gas and oxygen), the required methane gas stream is approx. 0.6 times that of oxygen. If the drill holes' areas differ by the factor indicated before, it will be possible to adapt the discharge velocities of the two gases in the drill holes of the burner to one another. In this way, the stability of the flame can be improved, for example.

In the aforedescribed embodiment of the ring burner, the alternate, separate supply of fuel gas and oxygen into adjacent drill holes on the burner surface is achieved by arranging two annular channels inside the burner and alternately connecting the drill holes in the burner surface to one of these annular channels. The burner is provided with a fuel gas supply pipe for one of these annular channels and an oxygen supply pipe for the other annular channel.

As regards said body in front of the end face of the combustion chamber, it can also be useful that this body be dome-shaped with a vault depth of 15 mm to 60 mm, preferably 20 mm, and a diameter larger than that of the combustion chamber, but smaller than the diameter of the end face, which dome-shaped body is made of heat-resistant, corrosion-proof steel and is arranged in a heat-insulated manner with its concave side facing towards the ring burner. In this way, the hot exhaust gas exiting from the combustion chamber is prevented from being held up in front of this body, which may adversely affect the mixing of hot exhaust gas exiting from the combustion chamber and additional oxygen blown in.

If pipes are arranged for the additional supply of oxygen (or air) into said gap at the end of the combustion chamber, the axes of these pipes are conveniently inclined relative to the axis of the combustion chamber at an angle of 60° to 85°, preferably 80°. This ensures that scrubbing agent from the scrubbing unit will not enter the combustion chamber, but flow outwards along the inclined pipes.

In addition, said pipes conveniently extend approx. 15 mm to 50 mm, preferably 25 mm, beyond the edge of the end face of the combustion chamber into the gap between the cylindrical jacket of the combustion chamber and the end face, but not beyond the edge of the cylindrical jacket. This measure ensures that no scrubbing agent enters the pipes for the additional supply of oxygen (or air) and the ends of said pipes will not heat up too much and, in consequence, corrode.

If an annular channel is arranged for the additional supply of oxygen (or air) into said annular gap, the annular channel is conveniently realized by means of a cylindrical pipe arranged concentrically to the combustion chamber and the supply pipe for oxygen (or air) is arranged at the opposite end of said annular channel. In this way, a more even distribution along the channel's circumference is achieved. In addition, the annular channel conveniently has a width of 1.5 to 2 mm.

The invention will now be explained by means of an exemplary embodiment of the device and with reference to the drawings, FIG. 1 to FIG. 4, in which.

Figure 1:
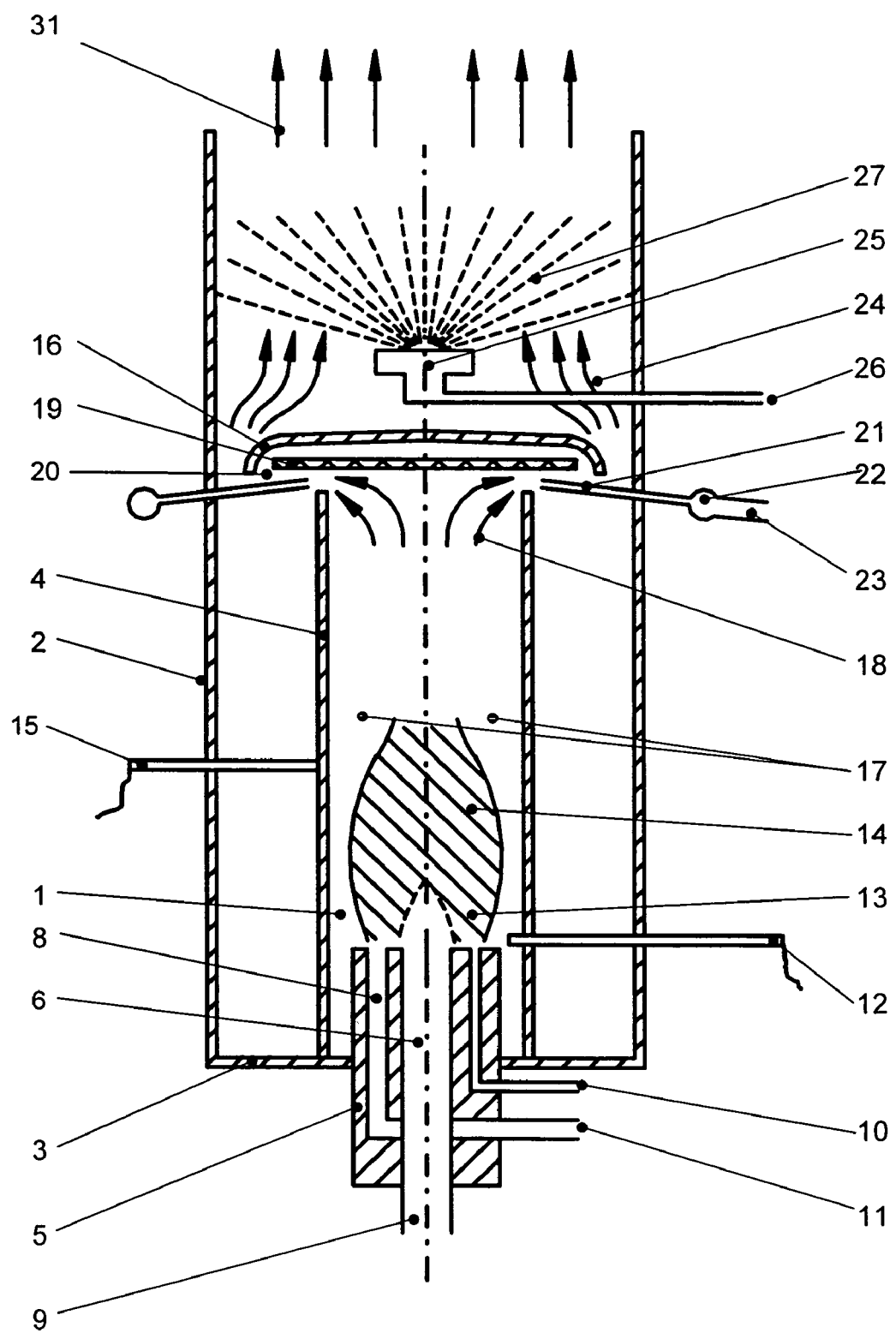
FIG. 1 shows a schematic longitudinal section of a device for the purification of exhaust gas in which additional oxygen is supplied via pipes.

The device essentially consists of a cylindrical combustion chamber (1) which is made of a corrosion-proof material and arranged in a housing (2) made of corrosion-proof steel. The combustion chamber has a diameter of 100 mm and a height of 400 mm. In the area of the base plate (3) and the cylindrical jacket (4), the combustion chamber is closed so that no outside air can flow in. The ring burner (5) having an outer diameter of 50 mm is arranged centrally in the base plate (3). The ring burner (5) is provided with a central drill hole (6) whose diameter is 12 mm and with the connection (9) for supplying the exhaust gas into the combustion chamber (1). In the surface of the ring burner (5), drill holes (7) with a diameter of 1 mm and drill holes (8) with a diameter of 1.2 mm for the separate supply of fuel gas and oxygen into the ring burner (5) are alternately arranged at even distances from one another on a hole circle (28) whose diameter is 30 mm. The ring burner is supplied with fuel gas via the connection (10) and with oxygen via the connection (11). Inside the ring burner (5), the supplied fuel gas is distributed along the annular channel (29) and the supplied oxygen is distributed along the annular channel (30). The drill holes (7) are connected to the annular channel (29) and the drill holes (8) are connected to the annular channel (30).

In order to operate the combustion chamber, 20 slm (standard litres per minute) $CH_4$ and 32 slm oxygen are supplied into the ring burner. The mixture of $CH_4$ and oxygen resulting directly above the burner corresponds to a $\lambda$-value of 0.8, i.e. it is a hypostoichiometric mixture of oxygen and fuel gas. Upon actuation of the ignition device (12), an annular flame (13) forms above the ring burner (5), close to the surface thereof, which flame changes into a flame (14) having a homogeneous cross section at a greater distance from the surface of the ring burner (5). The supply of oxygen and fuel gas is controlled with the aid of sensor signals of the monitor (15) facing towards the flame (14). 160 slm exhaust gas is introduced in this flame via the connection (9) and the central drill hole (6), which exhaust gas essentially consists of 158 slm nitrogen and approx. 2 slm $C_2F_6$.

Due to the $\lambda$-value of the mixture of separately supplied oxygen and separately supplied $CH_4$, the flame (14) has a reducing effect over its entire cross section once it has fully developed. Said reducing effect on the pollutant gas is also achieved in the flame envelope and even beyond, virtually throughout the whole volume (17) of the combustion chamber (1), since the flame is not exposed to air, i.e. oxygen, acting on it from the outside in the area of the ring burner (5). Essentially, $CH_4$, $O_2$ and $C_2F_6$ are converted into HF, $CO_2$, CO and $H_2O$ in the flame (13, 14) and in the remaining volume of the combustion chamber. The production of nitrogen oxides is largely avoided. A mixture of hot, treated exhaust gas (consisting of $N_2$, HF, $CO_2$ and CO) and unburned $CH_4$ whose temperature ranges between 800° and 1,200° Celsius flows out of the cylindrical part of the combustion chamber (1) towards the hot body (19), as indicated by the arrows (18).

The hot body (19) is made of corrosion-proof steel and has a diameter of 260 mm and a thickness of 2 mm. It is dome-shaped with a vault depth of 20 mm and is arranged in front of the cooled end face (16) having a diameter of 300 mm in a heat-insulated manner and with its concave side facing towards the ring burner (5). In the device according to the exemplary embodiment, the cooled end face (16) is also dome-shaped with a vault depth of 40 mm. The convex side of the cooled end face (16) faces towards the scrubbing unit (25). In one embodiment (FIG. 1), three pipes (21) which are arranged at an angle of 120° relative to one another in front of the body (19) and have an outer diameter of 6 mm extend 25 mm beyond the edge of the end face (16) into the 60 mm wide gap (20) between the cylindrical jacket (4) and the end face (16) of the combustion chamber (1), but not beyond the edge of the cylindrical jacket (4) into the combustion chamber. Said pipes are inclined at an angle of 80° relative to the axis of the combustion chamber (1). The pipes (21) are connected with one another via an annular pipe (22) which is arranged outside the housing (2) and to which additional oxygen is supplied via the connection (23). 11 slm oxygen are blown in via the pipes (21) at a rate of approx. 60 m s$^{-1}$.

Figure 2:
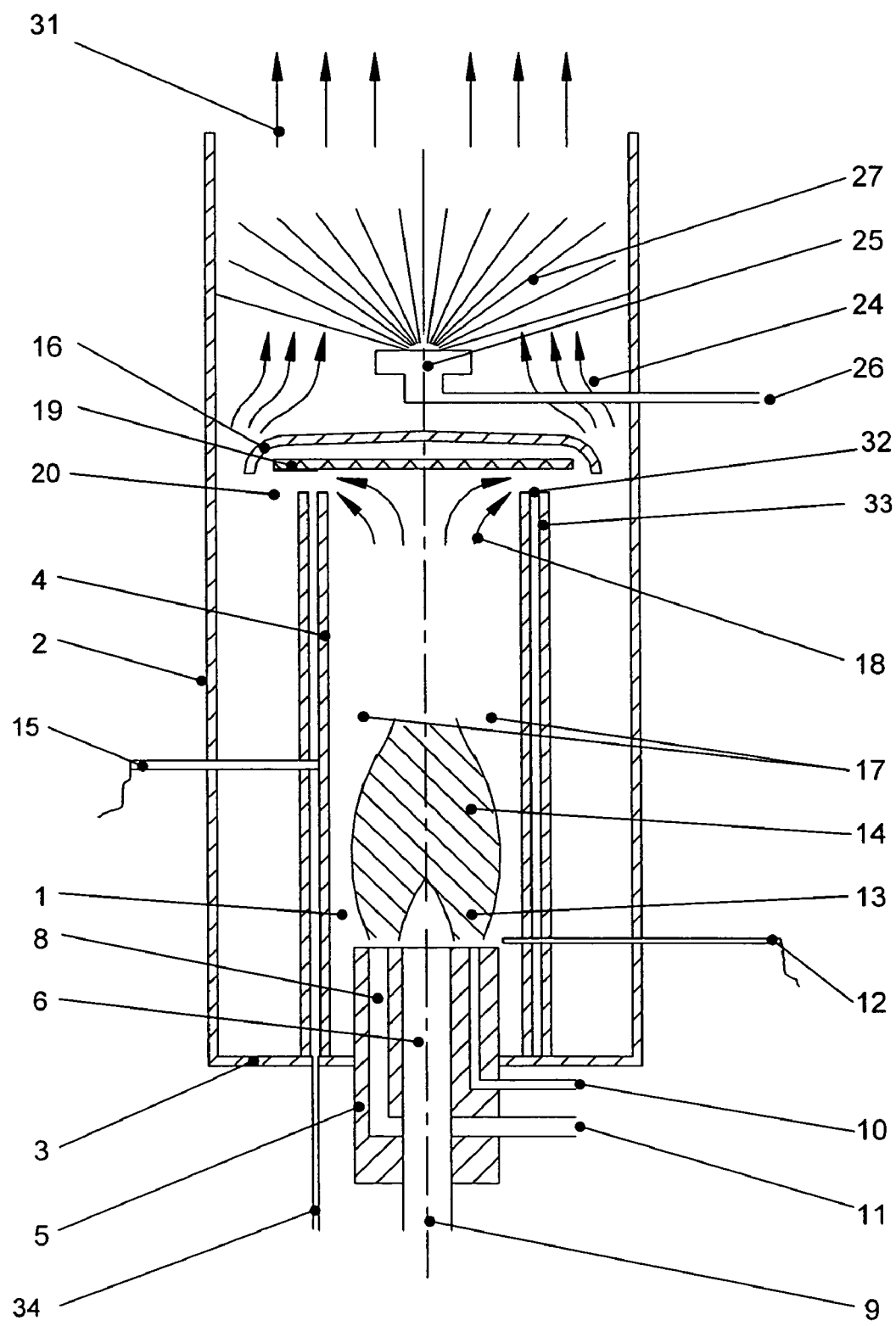
FIG. 2 shows a schematic longitudinal section of a device for the purification of exhaust gas in which additional oxygen is supplied via an annular channel.
Figure 3:
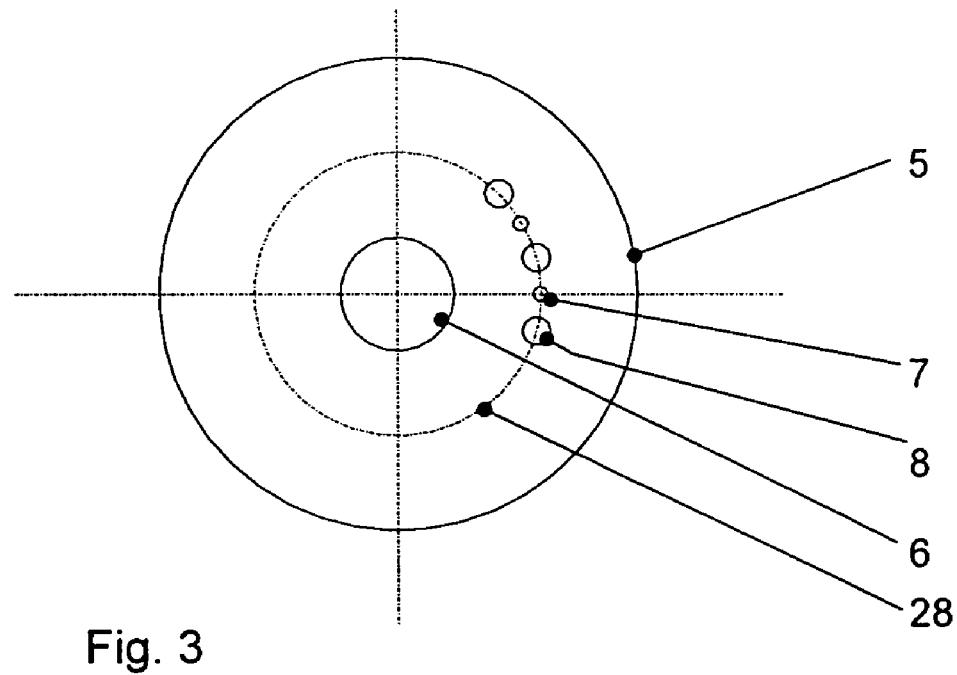
FIG. 3 shows the schematic plan view of a ring burner.
Figure 4:
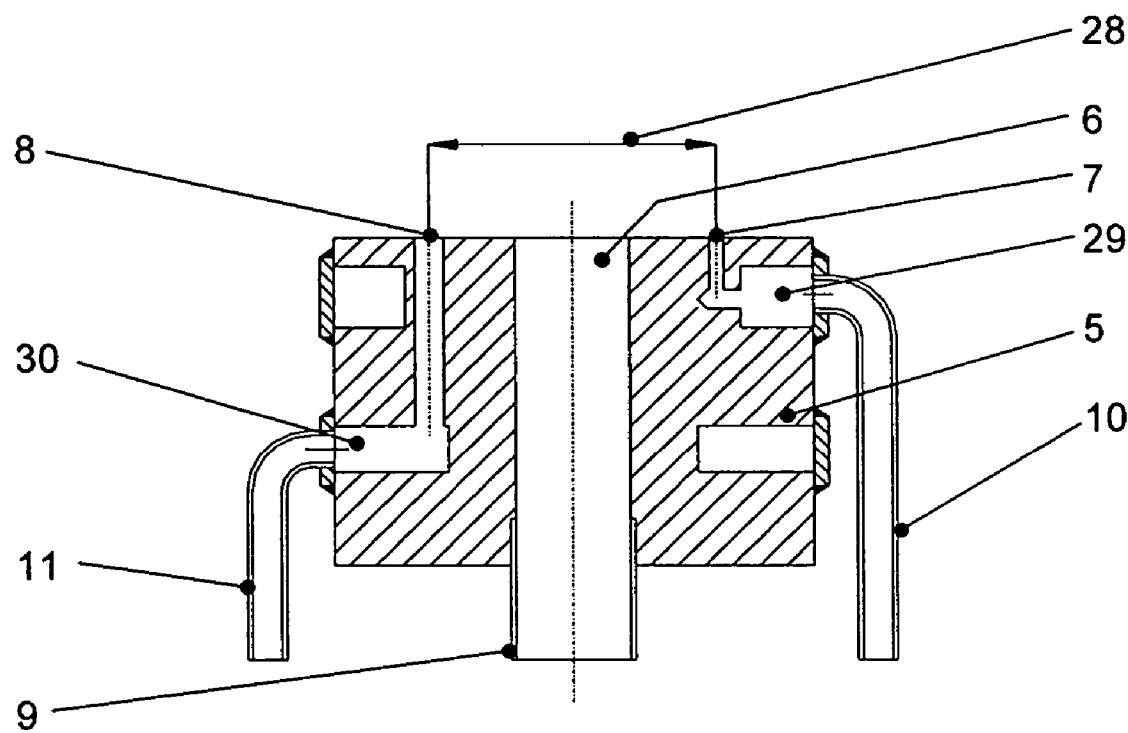
FIG. 4 shows the schematic cross section of a ring burner.

In another embodiment (FIG. 2), a double pipe (33) is arranged concentrically to the cylindrical combustion chamber (1) such that an annular channel (32) is formed between the cylindrical combustion chamber and the double pipe. Additional oxygen is supplied via this annular channel into the annular gap (20) evenly along the circumference thereof. Said oxygen (or air) is supplied to the annular channel via a connection (34) arranged at the opposite end of the annular channel. 20 slm oxygen (or 100 slm air) is supplied into the annular channel (32).

The hot exhaust gas stream and the oxygen blown in mix with one another due to turbulence in the area of the gap (20) in front of the body (19). Here, a hyperstoichiometric ratio of oxygen to unburned fuel gas results in the mixture of additional oxygen supplied and unburned $CH_4$. The λ-value of this gas mixture would be higher than 1.2. Therefore, the turbulent mixture of hot exhaust gas and additional oxygen supplied has an oxidizing effect. In a secondary combustion process, unburned constituents of the exhaust gas are completely burned; in particular, CO which has been produced in the reducing volume of the combustion chamber (1) is converted into $CO_2$ and $H_2O$.

The treated exhaust gas then flows out of the gap (20) towards the scrubbing unit (25), as indicated by the arrows (24). The scrubbing liquid (27) is supplied to said unit via the connection (26). Said liquid cools the hot exhaust gas to below 50° C. Hydrogen fluoride (HF) contained in the cooled exhaust gas is hydrolyzed and neutralized in the scrubbing liquid (a 1% sodium hydroxide solution).

The cleaned exhaust gas is discharged to the surrounding atmosphere, as indicated by the arrows (31), either directly via an exhauster or via the central exhaust air unit of the semiconductor plant.

The carbon monoxide content of the cleaned exhaust gas is 10 ppm. The discharge of nitrogen oxides is strongly reduced; in the exemplary exhaust gas purification process it is as low as ≈0.1 mol m$^{-3}$.

REFERENCE NUMERALS

1. Combustion chamber
2. Housing
3. Base plate
4. Cylindrical jacket
5. Ring burner
6. Central drill hole
7. Drill holes in the burner
8. Drill holes in the burner
9. Connection for exhaust gas
10. Connection for fuel gas
11. Connection for oxygen
12. Ignition device
13. Annular flame
14. Homogeneous flame
15. Monitor
16. Cooled end face
17. Volume of the combustion chamber
18. Arrows
19. Body
20. Gap
21. Pipes for additional oxygen
22. Annular pipe
23. Connection for oxygen
24. Arrows
25. Scrubbing unit
26. Connection for scrubbing liquid
27. Scrubbing liquid
28. Hole circle
29. Annular channel for fuel gas
30. Annular channel for oxygen
31. Arrows
32. Annular channel for additional oxygen
33 Cylindrical double pipe
34. Connection for oxygen

The invention claimed Is:

1. A device for the purification of exhaust gases containing nitrogen and pollutants, particularly those containing fluorocarbon compounds or other fluorine compounds, by thermal-chemical conversion in a cylindrical combustion chamber integrated with a subsequent scrubbing unit and using a burner with central exhaust gas supply and separate supply of fuel gas and oxygen characterized in that the ring burner is provided with drill holes which are arranged on a single hole circle and ensure the locally alternate, simultaneous supply of fuel gas and oxygen, the combustion chamber is closed except for an annular gap between the cylindrical jacket and the end face of the combustion chamber located opposite the burner, that a body, preferably a plate, made of heat-resistant and heat-insulating material is arranged in front of said end face of the combustion chamber, and that a double pipe is arranged concentrically to the cylindrical jacket of the combustion chamber, thus forming an annular channel for the supply of additional oxygen or additional air.

2. A device according to claim 1, characterized in that the annular channel between the cylindrical jacket of the combustion chamber and the double pipe for the supply of additional oxygen or additional air arranged concentrically thereto has a radial width of 1.5 to 2 mm.

3. A device according to claim 1, characterized in that the annular channel opens into the gap between the cylindrical jacket of the combustion chamber and the end face parallel to the direction of the axis of the combustion chamber.

4. A device according to claim 1, characterized in that the annular channel opens into the gap between the cylindrical jacket of the combustion chamber and the end face radially at an angle of 90° relative to the axis of the combustion chamber and facing towards said axis.

5. A device according to claim 1, characterized in that the annular channel opens into the gap between the cylindrical jacket of the combustion chamber and the end face radially at an angle of 90° relative to the axis of the combustion chamber and facing away from said axis.

6. A device according to claim 1, characterized in that the drill holes in the surface of the ring burner are distributed evenly on a hole circle and all have the same diameter.

7. A device according to claim 1, characterized in that the drill holes in the surface of the ring burner are distributed evenly on a hole circle and have two different diameters alternating with one another.

8. A device according to claim 1, characterized in that two annular channels are provided inside the ring burner, that the drill holes in the ring burner are alternately connected to one of these annular channels, and that the ring burner is provided with a connection for the supply of fuel gas to one of these annular channels and with a connection for the supply of oxygen to the other annular channel.

9. A device according to claim 1, characterized in that a body, preferably a plate, which is made of heat-resistant material and whose diameter is larger than that of the combustion chamber, but smaller than that of the end face (16) is arranged in front of said end face of the combustion chamber in the area of the gap in a heat-insulating manner.

10. A device according to claim 1, characterized in that a dome-shaped body with a vault depth of 15 mm to 60 mm, preferably 20 mm, which is made of heat-resistant, corrosion-proof steel and whose diameter is larger than that of the combustion chamber is arranged in front of said end face of the combustion chamber in the area of the gap in a heat-insulating manner and with its concave side facing towards the ring burner (5).

* * * * *